United States Patent Office 2,695,305
Patented Nov. 23, 1954

2,695,305

MERCURY COMPOUNDS OF PARA-AMINO SALICYLIC ACID DERIVATIVES AND A PROCESS OF PREPARING THEM

Gustav Ehrhart, Frankfurt am Main Hochst, Heinrich Ruschig, Frankfurt am Main Griesheim, and Heinrich Leditschke, Frankfurt am Main Hochst, Germany, assignors to Farbwerke Hoechst Aktiengesellschaft vormals Meister Lucius und Bruning, Frankfurt am Main Hochst, Germany, a German company No Drawing. Application September 22, 1952, Serial No. 310,936

Claims priority, application Germany September 26, 1951

10 Claims. (Cl. 260—434)

This invention relates to mercury compounds of para-amino salicylic acid derivatives and a process of preparing them.

In modern pharmacy diuretics play an important role. In most cases mercurial preparations are used, especially the derivatives of salicylic acid, for instance the complex mercury salicyl-allylamido-O-acetate sodium salt has gained considerable importance in therapy.

We have found that highly effective and essentially less toxic preparations than the above-mentioned compounds of mercury-salicylic acid can be obtained by reacting esters of para-amino-salicylic acid, acylated in the amino group by a lower aliphatic carboxylic acid radical, with allylamine, condensing the allylamides thus obtained in an alkaline medium with lower aliphatic halocarboxylic acids and reacting the condensation products with mercury salts of organic acids in the persence of water or aliphatic mono- or polyhydric alcohols.

The compounds produced according to this invention correspond to the following general formula

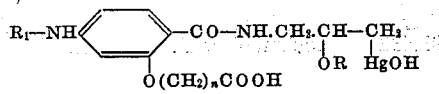

in which R stands for hydrogen or a lower alkyl or lower hydroxyalkyl radical, $R_1$ represents a lower aliphatic acyl radical and $n$ is a number from 1 to 3.

As acyl radicals at the nitrogen atom there are concerned the radicals of aliphatic, aromatic and araliphatic carboxylic acids, for instance acetyl, propionyl, butyryl, cyclopentylpropionyl, benzoyl, phenacetyl and others. It is advantageous to use compounds containing low aliphatic acyl radicals, such as acetyl, propionyl and butyryl, at the hydrogen atom, as the final products then dissolve more readily in water.

As esters of para-amino-salicylic acid, the esters with aromatic alcohols or phenols can also be used besides those with aliphatic alcohols. It is, however, preferable to use the esters with aliphatic alcohols, especially low aliphatic alcohols such as methanol, ethanol, propanol, isopropanol, butanol or amyl alcohol.

As halocarboxylic acids there may in the first place be mentioned, for instance, aliphatic halocarboxylic acids. In particular it may be advantageous to use low aliphatic halocarboxylic acids such as chloracetic acid, bromacetic acid or iodoacetic acid, chloropropionic acid, bromopropionic acid or iodopropionic acid, chlorobutyric acid, bromobutyric acid or iodobutyric acid.

As alcohols used as solvents in mercurization, monohydric and polyhydric alcohols may be used, for instance methanol, ethanol, propanol, isopropanol, butanol, amyl alcohol, ethylene glycol, 1.3-propylene glycol, 1.2-propylene glycol, 1.4-butanediol, glycerol and the like. Especially advantageous is the use of polyhydric low aliphatic alcohols, because, by their use, the compatibility of the compounds and their solubility in water are remarkably increased.

The substances obtained are white, crystalline compounds.

The alkali salts dissolve in water with a feebly alkaline reaction. The solutions may be buffered, for instance with theocine.

The compounds obtained according to the process of the present invention are highly effective diuretics and are well tolerated, especially the compounds containing hydroxyalkoxy radicals show particularly good comparatibility and increased solubility in water.

The following examples serve to illustrate the invention but they are not intended to limit thereto:

Example 1

17 grams of 4-acetylamino-2-hydroxy-benzoic acid-methyl ester are heated to 105° C. for 7 hours in a bomb tube with 11 cc. of allylamine. The contents of the tube are taken up with acetone, the solvent and any excess of allylamine are distilled off and the residue is recrystallized from acetone. The 4-acetyl-amino-2-hydroxy-benz-allylamide thus obtained melts at 218° C. (uncorrected).

14.05 grams of this product are dissolved in 80 cc. of water with 7 cc. of sodium hydroxide solution of 33 per cent. strength. To the solution produced 12.4 grams of chloracetic acid and 11 cc. of sodium hydroxide solution of 33 per cent. strength are added in portions at 5° C. in such a manner that the solution continuously remains alkaline to phenolphthalein. Finally, a further 5 cc. of sodium hydroxide solution of 33 per cent. strength are added, the pH value thereby rising to 12.5. The mixture is heated on the water bath for 2 hours whereby the pH falls to the neutral point and the reaction product partially precipitates. The mixture is diluted with water and by acidifying it with concentrated hydrochloric acid, the 4-acetylamino-1-(N-allylcarbamido)-phenoxy-acetic acid-2 is obtained as a crude product. It is recrystallized from methanol and melts at 231° C. Into a solution of 8.35 grams of this product in 120 cc. of absolute methanol is run a solution of 7.7 grams of mercuric acetate in 140 cc. of absolute methanol and the reaction mixture is heated under reflux for 1 hour. The mercury addition product precipitates immediately, it is well washed with absolute methanol and ether and dried. The 4-acetylamino-1-[N-(3'-hydroxy-mercuric-2'-methoxy-propyl-(1'))-carbamido]-phenoxyactic acid-(2) melts at 195° C. with decomposition. In order to convert the free acid into the sodium salt, one proceeds as follows:

12.25 grams of the mercury addition product are suspended in 18 cc. of absolute methanol and a sodium methylate solution of 0.55 gram of sodium and 15 cc. of methanol is slowly added drop by drop. The addition product gradually dissolves. The solution is passed through a close filter and the sodium salt is precipitated from the clear filtrate with a mixture of 320 cc. of ether and 90 cc. of ethanol. The solution is filtered off with suction and well washed with ether and dried.

A white, crystalline powder is obtained, which, when exposed to air for a prolonged time is hygroscopic. The aqueous solution reacts feebly alkaline and can be buffered with theocine.

Example 2

A hot solution of 31.8 grams of mercuric acetate in 500 cc. of water is added to a solution of 29.2 grams of 4-acetylamino-1-(N-allylcarbamido)-phenoxyacetic acid-(2) in 3.5 litres of water. The mercury addition product precipitates immediately. The precipitate is filtered off with suction, dissolved in sodium carbonate solution, the solution is filtered and the filtrate is acidified with glacial acetic acid. The 4-acetylamino-1-[N-(3'-hydroxy-mercuric-2'-hydroxy-propyl-(1'))-carbamido]-2-phenoxyacetic acid separates in pure form and melts at 203° C. with decomposition; the yield amounts to 41.2 grams. The sodium salt of the phenoxy-acetic acid thus obtained is easily water-soluble; the solution can be buffered with theocine.

Example 3

29.2 grams of 4-acetylamino-1-(N-allylcarbamido)-phenoxy-acetic acid-(2) are dissolved, in the hot, in 500 cc. of ethyleneglycol and a hot solution of 31.8 grams of mercuric acetate in 300 cc. of glycol is added. The mercury addition product separates immediately. After being allowed to stand for one day it is filtered off, well washed with water and, while moist, dissolved again in sodium carbonate solution. The solution is treated with carbon, filtered and acidified with glacial acetic acid. The 4-acetylamino-1-[N-(3'-hydroxy-mercuric-2'-hydroxy - ethoxy - propyl - (1')) - carbamido] - 2-phenoxy-acetic acid precipitates in a pure form and melts at 196° C.–197° C. with decompositon; (sintering begins from 190° C.). The yield amounts to 36.1 grams. The sodium salt of the phenoxyacetic acid thus obtained dissolves in water. The solution can be buffered with theocine.

*Example 4*

To a hot solution of 14.6 grams of 4-acetylamino-1-(N-allylcarbamido)-phenoxyacetic acid-(2) in 150 cc. of 1.2-propylene glycol is added a solution of 15.9 grams of mercuric acetate in 150 cc. of 1.2-propylene glycol, while hot. The mercury addition compound, which precipitates immediately, is, after being allowed to stand for 1 day, filtered off with suction, washed with water, dissolved in sodium carbonate solution, while moist, and the solution is acidified with glacial acetic acid. The 4-acetylamino-1-[N-(3'-hydroxy - mercuric - 2' - β - hydroxy-propoxy - propyl-(1'))-carbamido]-2-phenoxy-acetic acid separates; it melts at 194° C. with decomposition. The yield amounts to 20.35 grams. The sodium salt of the compound thus obtained is water-soluble; the solution can be buffered with theocine.

We claim:
1. Compounds of the general formula:

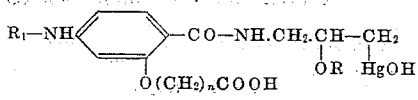

in which R stands for a member selected from the group consisting of hydrogen, lower alkyl and lower hydroxyalkyl radicals, R₁ represents a lower aliphatic acyl radical and $n$ is a number from 1 to 3.

2. The compound of the formula:

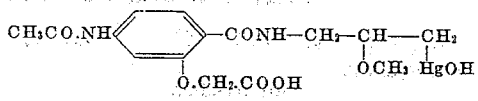

3. The compound of the formula:

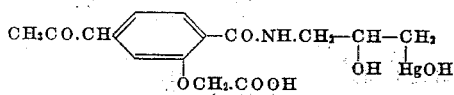

4. The compound of the formula:

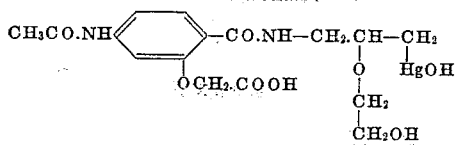

5. The compound of the formula:

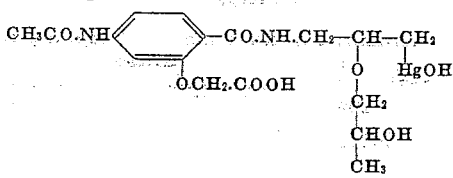

6. A process for the preparation of mercury compounds of para-amino salicylic acid derivatives, wherein a p-amino-salicylic acid ester, acylated in the amino group by a lower aliphatic carboxylic acid radical, is reacted with allylamide, the allylamide thus obtained is condensed, in an alkaline medium, with a lower aliphatic halocarboxylic acid and the condensation product is reacted with a mercury salt of an organic acid in the presence of a liquid selected from the group consisting of water and lower aliphatic alcohols.

7. A process as claimed in claim 6, wherein there is used as liquid a lower aliphatic polyhydric alcohol.

8. A process for the preparation of mercury compounds of para-amino-salicylic acid derivatives, wherein a p-acetylamino salicylic acid ester is reacted with allylamine, the allylamide thus obtained is condensed, in an alkaline medium, with chloracetic acid and the condensation product is reacted with mercury acetate in the presence of a polyhydric alcohol.

9. A process as claimed in claim 8, wherein 1.2-propylene glycol is used as polyhydric alcohol.

10. A process as claimed in claim 8, wherein ethylene glycol is used as polyhydric alcohol.

References Cited in the file of this patent

UNITED STATES PATENTS

| Number | Name | Date |
|---|---|---|
| 1,693,432 | Bockmühl et al. | Nov. 27, 1928 |